United States Patent
Nagaoka et al.

(10) Patent No.: US 7,586,400 B2
(45) Date of Patent: Sep. 8, 2009

(54) VEHICLE SURROUNDINGS MONITORING APPARATUS

(75) Inventors: Nobuharu Nagaoka, Wako (JP); Takayuki Tsuji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 289 days.

(21) Appl. No.: 11/653,149

(22) Filed: Jan. 12, 2007

(65) Prior Publication Data

US 2007/0171033 A1 Jul. 26, 2007

(30) Foreign Application Priority Data

Jan. 16, 2006 (JP) ............... 2006-007019
Dec. 26, 2006 (JP) ............... 2006-349746

(51) Int. Cl.
*B60Q 1/00* (2006.01)
(52) U.S. Cl. ............... 340/425.5; 340/937; 340/435; 340/436; 701/301; 348/135
(58) Field of Classification Search ............. 340/425.5, 340/937, 933, 935, 936, 435, 436, 438; 701/301; 348/25, 73, 135, 137, 140, 148
See application file for complete search history.

(56) References Cited

U.S. PATENT DOCUMENTS 6,531,959 B1 * 3/2003 Nagaoka et al. ............ 340/435
6,618,672 B2 * 9/2003 Sasaki et al. ............... 701/301
7,262,710 B2 * 8/2007 Watanabe et al. ............ 340/903
7,436,982 B2 * 10/2008 Taniguchi et al. ........... 382/104

FOREIGN PATENT DOCUMENTS

EP      1 236 126 B1    9/2002
JP      2001-006096     1/2001

* cited by examiner

*Primary Examiner*—Toan N Pham
(74) *Attorney, Agent, or Firm*—Carrier, Blackman & Associates, P.C.; William D. Blackman; Joseph P. Carrier

(57) ABSTRACT

A vehicle surroundings monitoring apparatus which determines whether there is a possibility of contact between a vehicle and a monitored object around the vehicle with a single camera mounted thereon. It includes a monitored object extraction process unit (20) which extracts an image portion of the monitored object from an image taken by a single infrared camera (2), a rate-of-change calculation process unit (21) which calculates a rate of change in size of the image portion of an identical monitored object extracted by the monitored object extraction process unit (20) from a plurality of images taken by the infrared camera (2) at predetermined time intervals, an arrival time estimation process unit (22) which estimates the time to arrival of the monitored object at the vehicle based on the rate of change, a real space position calculation process unit (23) which calculates a position of the monitored object in the real space based on the rate of change, a movement vector calculation process unit (24) which calculates a movement vector from a displacement of the position of the monitored object in the real space, and a contact determination process unit (25) which determines whether there is a possibility of contact between the monitored object and the vehicle.

9 Claims, 10 Drawing Sheets

FIG. 3
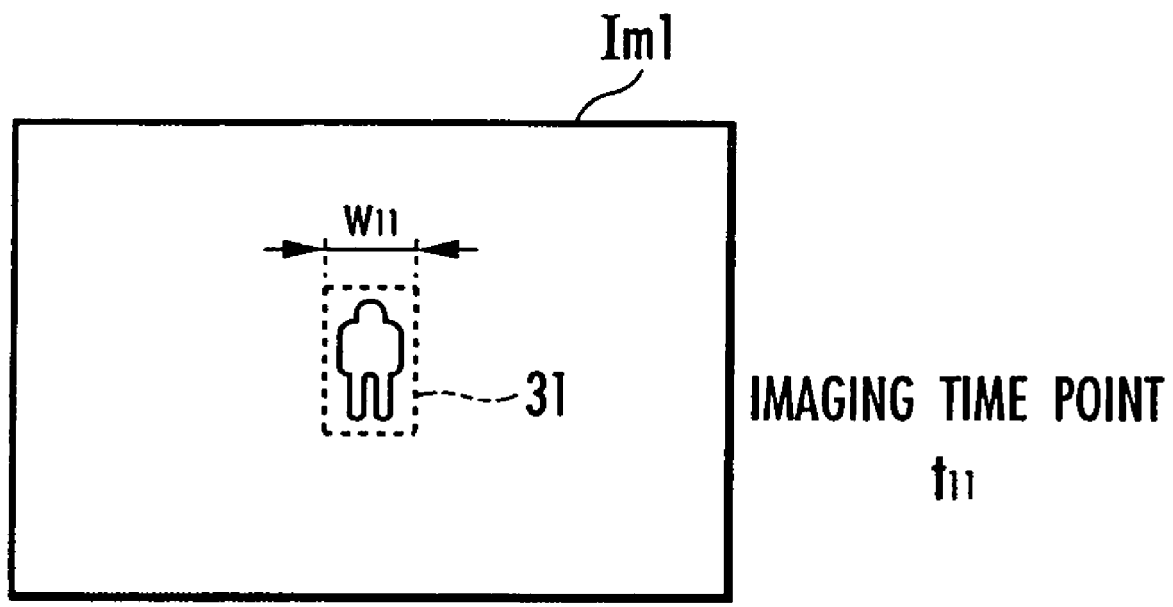
IMAGING TIME POINT $t_{11}$
AFTER dT (sec)
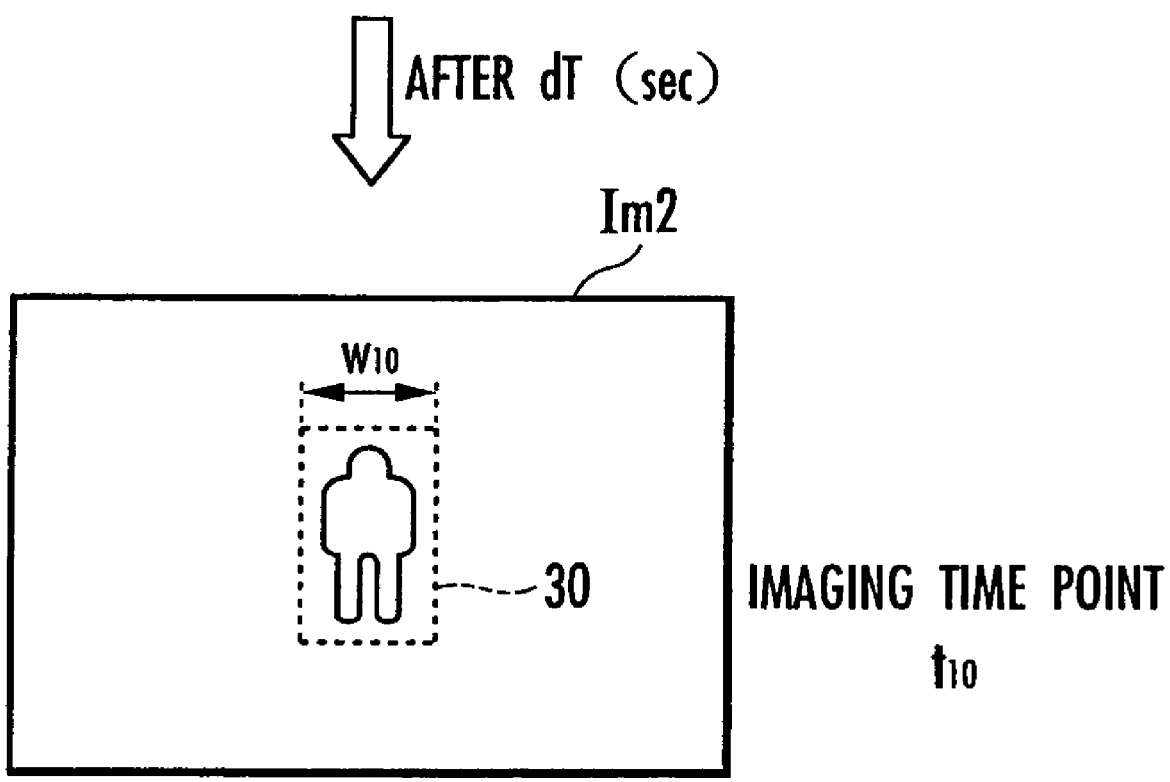
IMAGING TIME POINT $t_{10}$

FIG. 5
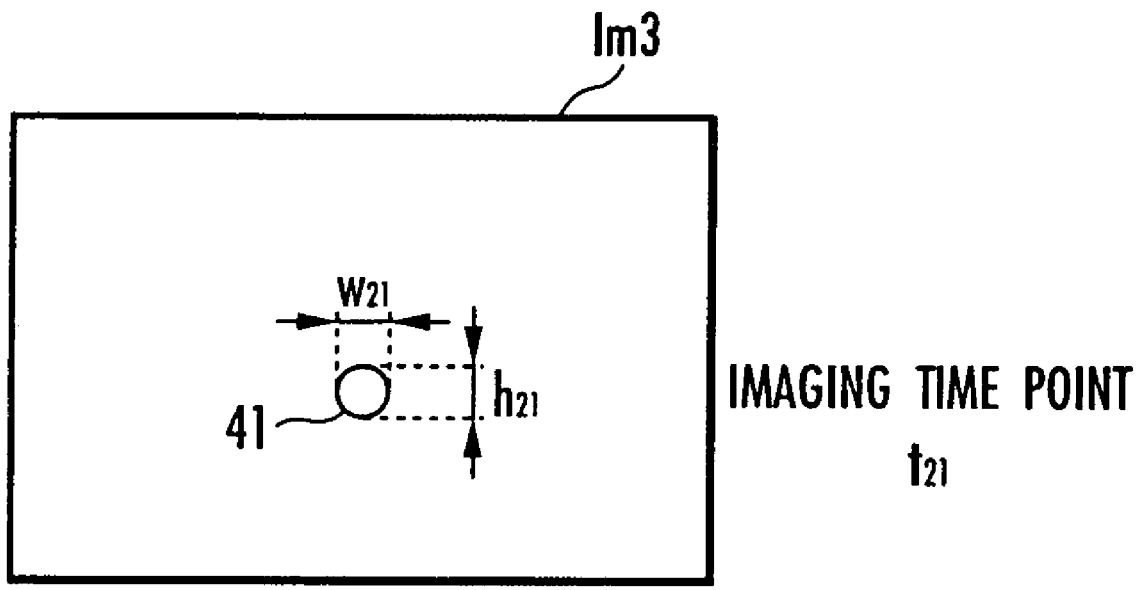
IMAGING TIME POINT $t_{21}$
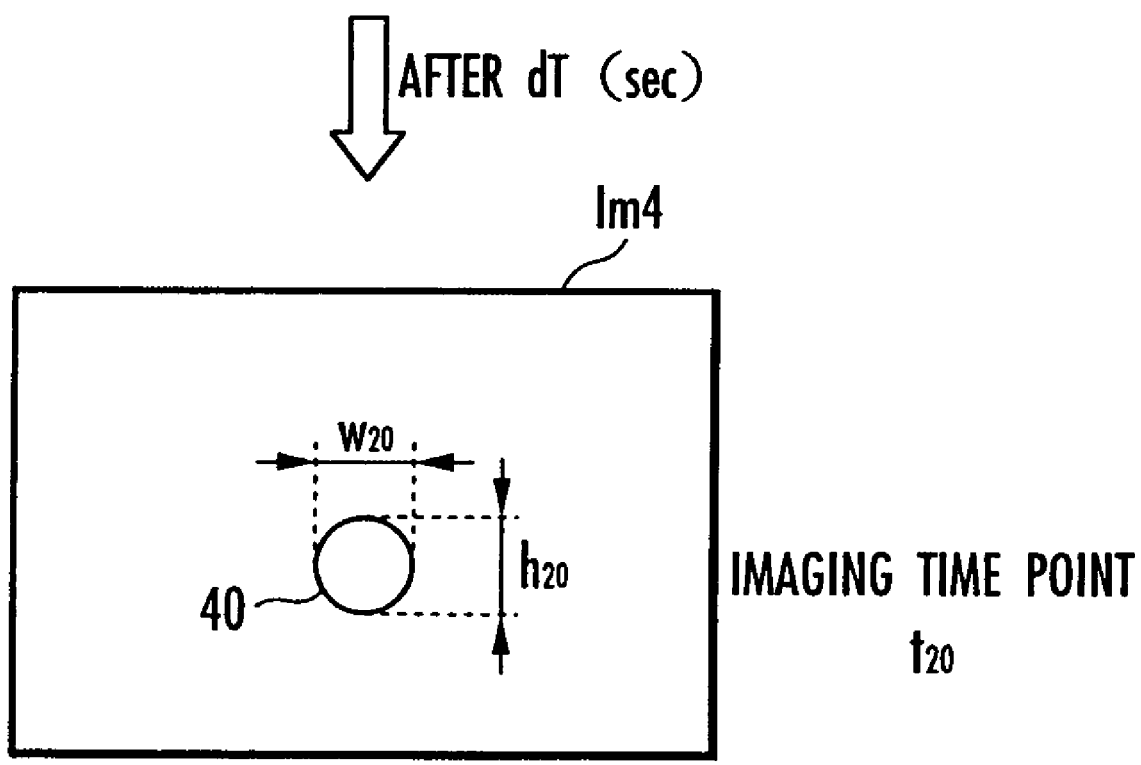
IMAGING TIME POINT $t_{20}$

VEHICLE SURROUNDINGS MONITORING APPARATUS

BACKGROUND OF THE INVENTION

1. Field of the Invention

The present invention relates to a vehicle surroundings monitoring apparatus which detects a monitored object existing around a vehicle from images obtained by a camera mounted on the vehicle and monitors the surroundings of the vehicle.

2. Related Background Art

Conventionally, there has been suggested a vehicle surroundings monitoring apparatus which has two cameras mounted on a vehicle and detects a distance between a monitored object and the vehicle by the principle of triangulation based on a difference (parallax) between image portions of the identical monitored object extracted from images of the surroundings of the vehicle taken by the cameras (for example, refer to Japanese Patent Laid-Open No. 2001-6096).

According to the conventional vehicle surroundings monitoring apparatus, the distance between the monitored object around the vehicle and the vehicle is calculated. Then, the vehicle surroundings monitoring apparatus finds a movement vector of the monitored object in a real space by converting the position of the monitored object from the image coordinates to real space coordinates based on the distance and determines whether there is a possibility of contact between the monitored object and the vehicle.

Where the distance between the vehicle and the monitored object is detected based on the parallax in this way, however, there has been a problem of an increase in cost caused by provision of two cameras and requiring a complicated work for installation such as strict adjustments of optical axes of these cameras.

Therefore, it is an object of the present invention to solve the above problem and to provide a vehicle surroundings monitoring apparatus capable of determining whether there is a possibility of contact between a monitored object around a vehicle and the vehicle with a simple arrangement in which the vehicle is provided with a single camera.

SUMMARY OF THE INVENTION

According to a first aspect of the present invention, there is provided a vehicle surroundings monitoring apparatus which detects a monitored object around a vehicle from images taken by a single camera mounted on the vehicle, comprising: a monitored object extraction process unit which extracts an image portion of the monitored object from the image taken by the camera; a rate-of-change calculation process unit which calculates a rate of change in size of the image portion of an identical monitored object extracted by the monitored object extraction process unit from a plurality of images taken by the camera at predetermined time intervals; and an arrival time estimation process unit which estimates vehicle arrival time which is the time to arrival of the monitored object at the vehicle based on the rate of change.

According to the above invention, if the monitored object around the vehicle is imaged more than once at the predetermined time intervals, a change in size of the image portion of the monitored object at each time becomes more significant in the taken image as the relative speed between the monitored object and the vehicle increases. Moreover, the higher the relative speed is, the shorter the vehicle arrival time is. Therefore, the arrival time estimation process unit estimates the vehicle arrival time based on the rate of change in size of the image portion of the identical monitored object calculated by the rate-of-change calculation process unit, by which the surroundings of the vehicle can be monitored. According to the present invention, the vehicle arrival time can be estimated from the image taken by the single camera in this manner, thereby reducing cost of the apparatus in comparison with a case of using two cameras. In addition, this facilitates camera mounting on the vehicle.

According to a second aspect of the present invention, there is provided a vehicle surroundings monitoring apparatus which detects a monitored object around a vehicle from images taken by a single camera mounted on the vehicle, comprising: a monitored object extraction process unit which extracts an image portion of the monitored object from the image taken by the camera; a rate-of-change calculation process unit which calculates a rate of change in size of the image portion of an identical monitored object extracted by the monitored object extraction process unit from a plurality of images taken by the camera at predetermined time intervals; and a contact determination process unit which determines whether there is a possibility of contact between the monitored object and the vehicle based on the rate of change.

According to the above invention, if the monitored object around the vehicle is imaged more than once at the predetermined time intervals, a change in size of the image portion of the monitored object at each time becomes more significant in the taken image as the relative speed between the monitored object and the vehicle increases. Therefore, the contact determination process unit can estimate the change in relative position between the monitored object and the vehicle from the rate of change in size of the image portion of the identical monitored object calculated by the rate-of-change calculation process unit and determine whether there is a possibility of contact between the monitored object and the vehicle. Thereby, according to the present invention, it is possible to determine whether there is a possibility of contact between the monitored object and the vehicle from the images taken by the single camera in this manner, thereby reducing the cost of the apparatus in comparison with a case of using two cameras. In addition, this facilitates camera mounting on the vehicle.

Moreover, in the second aspect of the present invention, the vehicle surroundings monitoring apparatus further comprises an arrival time estimation process unit which estimates vehicle arrival time which is the time to arrival of the monitored object at the vehicle based on the rate of change, and the contact determination process unit determines whether there is a possibility of contact between the monitored object and the vehicle based on the vehicle arrival time.

According to the above invention, the higher the rate of change is, the higher the relative speed between the monitored object and the vehicle is and the shorter the vehicle arrival time is. Therefore, the arrival time estimation process unit can estimate the vehicle arrival time based on the rate of change and the contact determination process unit can determine whether there is a possibility of contact between the monitored object and the vehicle based on the vehicle arrival time.

Moreover, in the second aspect of the present invention, the vehicle surroundings monitoring apparatus further comprises: a speed sensor which detects a traveling speed of the vehicle; and a real space position calculation process unit which calculates a position of the monitored object in a real space by using a traveling speed detected by the speed sensor and the rate of change calculated by the rate-of-change calculation process unit, and the contact determination process unit determines whether there is a possibility of contact between the monitored object and the vehicle based on the position of the monitored object in the real space calculated by the real space position calculation process unit.

According to the above invention, while the details will be described later, the position of the monitored object in the real space can be calculated based on the vehicle traveling speed and the rate of change and the contact determination process unit can determine whether there is a possibility of contact between the monitored object and the vehicle from the position of the monitored object in the real space.

Moreover, in the second aspect of the present invention, the vehicle surroundings monitoring apparatus further comprises a movement vector calculation process unit which calculates a movement vector of the monitored object in the real space from the position of the identical monitored object in the real space at different time points calculated by the real space position calculation process unit, and the contact determination process unit determines whether there is a possibility of contact between the monitored object and the vehicle based on the movement vector calculated by the movement vector calculation process unit.

According to the above invention, the contact determination process unit can determine whether there is a possibility of contact between the monitored object and the vehicle more accurately by reducing the effect of calculation errors in the position of the monitored object in the real space using the movement vector of the monitored object in the real space.

Furthermore, in the second aspect of the present invention, the vehicle surroundings monitoring apparatus further comprises a position variation calculation process unit which calculates a position variation of the image portion of the identical monitored object extracted by the monitored object extraction process unit from the plurality of images taken by the camera at the predetermined time intervals, wherein the contact determination process unit determines that there is a high possibility of contact between the monitored object and the vehicle when the rate of change in size of the image portion calculated by the rate-of-change calculation process unit indicates a magnification of the image portion, regarding the image portion of the identical monitored object extracted by the monitored object extraction process unit from the plurality of images taken by the camera at the predetermined time intervals from a predetermined time point, and the position variation of the image portion calculated by the position variation calculation process unit is equal to or lower than a predetermined position variation threshold value.

According to the above invention, when the rate of change in size of the image portion calculated by the rate-of-change calculation process unit indicates a magnification of the image portion, regarding the image portion of the monitored object extracted by the monitored object extraction process unit from the plurality of images taken by the camera at the predetermined time intervals from the predetermined time point, it is possible to determine that the vehicle and the monitored object are coming close to each other and that the distance between the vehicle and the monitored object is decreasing. Furthermore, when the position variation calculated by the position variation calculation process unit is equal to or lower than the threshold value, it is possible to determine that the monitored object is coming close to the vehicle. Therefore, in this instance, the contact determination process unit can determine that there is a high possibility of contact between the monitored object and the vehicle.

Still further, the vehicle surroundings monitoring apparatus further comprises an arrival time estimation process unit which estimates the vehicle arrival time which is the time to arrival of the monitored object at the vehicle based on the rate of change, wherein the contact determination process unit determines that there is a high possibility of contact between the monitored object and the vehicle when the rate of change in size of the image portion calculated by the rate-of-change calculation process unit indicates a magnification of the image portion, regarding the image portion of the identical monitored object extracted by the monitored object extraction process unit from the plurality of images taken by the camera at the predetermined time intervals from the predetermined time point, the position variation of the image portion calculated by the position variation calculation process unit is equal to or lower than the predetermined position variation threshold value, and the vehicle arrival time estimated by the arrival time estimation process unit is equal to or less than a predetermined time.

According to the above invention, the contact determination process unit can determine that there is a high possibility of contact between the monitored object and the vehicle only within the instances where the vehicle arrival time is equal to or less than the predetermined time and the situation is very emergent before the contact between the vehicle and the monitored object.

Furthermore, the vehicle surroundings monitoring apparatus further comprises: a ranging process unit which detects a distance between the vehicle and the monitored object; and a threshold setting process unit which sets the threshold value according to the distance between the vehicle and the monitored object.

According to the above invention, a change in position of the image portion of the monitored object in the image is more significant than a change in position of the monitored object in the real space as the distance between the vehicle and the monitored object decreases. Therefore, the threshold setting process unit sets the position variation threshold value according to the distance between the vehicle and the monitored object, thereby increasing the accuracy of determining the possibility of contact between them.

Moreover, the vehicle surroundings monitoring apparatus is characterized by that the position variation threshold setting process unit sets the position variation threshold value based on the distance between the vehicle and the monitored object at each imaging timing detected by the ranging process unit, the vehicle width or vehicle height of the vehicle, and a focal length of the camera when the monitored object is taken by the camera at the predetermined time intervals from the predetermined time point.

According to the above invention, the position variation threshold value reflecting the movement situation of the monitored object in the real space and the size of the vehicle can be set based on the distance between the vehicle and the monitored object at each imaging timing detected by the ranging process unit, the vehicle width or vehicle height of the vehicle, and the focal length of the camera, while the details will be described later.

Moreover, in the first and second aspects of the vehicle surroundings monitoring apparatus of the present invention, the rate-of-change calculation process unit regards an image portion of the monitored object extracted from one of the plurality of images taken by the camera at the predetermined time intervals as a standard image, calculates a correlation degree with an image portion of the monitored object in the other image by enlarging or reducing the standard image at a predetermined ratio, and calculates an enlargement ratio or a reduction ratio of the standard image at the highest correlation degree as the rate of change.

According to the above invention, if the correlation degree with the image portion of the other monitored object is calculated by enlarging or reducing the standard image, the enlargement or reduction ratio of the standard image at the highest correlation degree is approximate to the ratio in size between the image portion of the other monitored object and the standard image. Therefore, the rate-of-change calculation process unit can calculate the ratio in size between the image portion of the other monitored object and the standard image as the rate of change.

Subsequently, according to a third aspect of the present invention, there is provided a vehicle surroundings monitoring apparatus which detects a monitored object around a vehicle by using a computer, the apparatus being provided with the computer having an interface circuit for accessing images taken by a single camera mounted on the vehicle, wherein the computer performs: a monitored object extraction process of extracting an image portion of the monitored object from the image taken by the camera; a rate-of-change calculation process of calculating a rate of change in size of the image portion of an identical monitored object extracted in the monitored object extraction process from a plurality of images taken by the camera at predetermined time intervals; and an arrival time estimation process of estimating vehicle arrival time which is the time to arrival of the monitored object at the vehicle based on the rate of change.

According to the above invention, if the monitored object around the vehicle is imaged more than once at the predetermined time intervals, a change in size of the image portion of the monitored object at each time becomes more significant in the taken image as the relative speed between the monitored object and the vehicle increases. Moreover, the higher the relative speed is, the shorter the vehicle arrival time is. Therefore, the computer can calculate the rate of change in size of the image portion of the identical monitored object by performing the rate-of-change calculation process and can estimate the vehicle arrival time based on the rate of change by performing the arrival time estimation process. Thereby, the surroundings of the vehicle can be monitored by the vehicle arrival time. Since the vehicle arrival time can be estimated from the image taken by the single camera in this case, it is possible to reduce cost of the apparatus in comparison with a case of using two cameras. In addition, this facilitates camera mounting on the vehicle.

Subsequently, according to the present invention, there is provided a vehicle surroundings monitoring method which detects a monitored object around a vehicle by using a computer having an interface circuit for accessing images taken by a single camera mounted on the vehicle, comprising: a monitored object extraction step of extracting an image portion of the monitored object from the image taken by the camera by the computer; a rate-of-change calculation step of calculating a rate of change in size of the image portion of an identical monitored object extracted in the monitored object extraction step from a plurality of images taken by the camera at predetermined time intervals by the computer; and an arrival time estimation step of estimating vehicle arrival time which is the time to arrival of the monitored object at the vehicle based on the rate of change by the computer.

According to the above invention, if the monitored object around the vehicle is imaged more than once at the predetermined time intervals, a change in size of the image portion of the monitored object at each time becomes more significant in the taken image as the relative speed between the monitored object and the vehicle increases. Moreover, the higher the relative speed is, the shorter the vehicle arrival time is. Therefore, the computer can calculate the rate of change in size of the image portion of the identical monitored object by performing the monitored object extraction step and the rate-of-change calculation step and can estimate the vehicle arrival time by performing the arrival time estimation step. Then, the surroundings of the vehicle can be monitored by the vehicle arrival time. Since the vehicle arrival time can be estimated from the image taken by the single camera in this case, it is possible to reduce cost of the apparatus in comparison with a case of using two cameras. In addition, this facilitates camera mounting on the vehicle.

Subsequently, according to the present invention, there is provided a vehicle surroundings monitoring program for use in detecting a monitored object around a vehicle by using a computer having an interface circuit for accessing images taken by a single camera mounted on the vehicle, the program causing the computer to function as: a monitored object extraction process unit which extracts an image portion of the monitored object from the image taken by the camera; a rate-of-change calculation process unit which calculates a rate of change in size of the image portion of an identical monitored object extracted by the monitored object extraction process unit from a plurality of images taken by the camera at predetermined time intervals; and an arrival time estimation process unit which estimates vehicle arrival time which is the time to arrival of the monitored object at the vehicle based on the rate of change.

By causing the computer to execute the vehicle surroundings monitoring program according to the above invention, it is possible to construct the monitored object extraction process unit, the rate-of-change calculation process unit, and the arrival time estimation process unit according to the first aspect of the vehicle surroundings monitoring apparatus of the present invention described above.

BRIEF DESCRIPTION OF THE DRAWINGS

FIG. 3 is an explanatory diagram showing a change in size of an image portion of a monitored object;

FIG. 5 is an explanatory diagram showing tracking of the monitored object at time intervals;

DETAILED DESCRIPTION OF THE PREFERRED EMBODIMENTS

Figure 1:
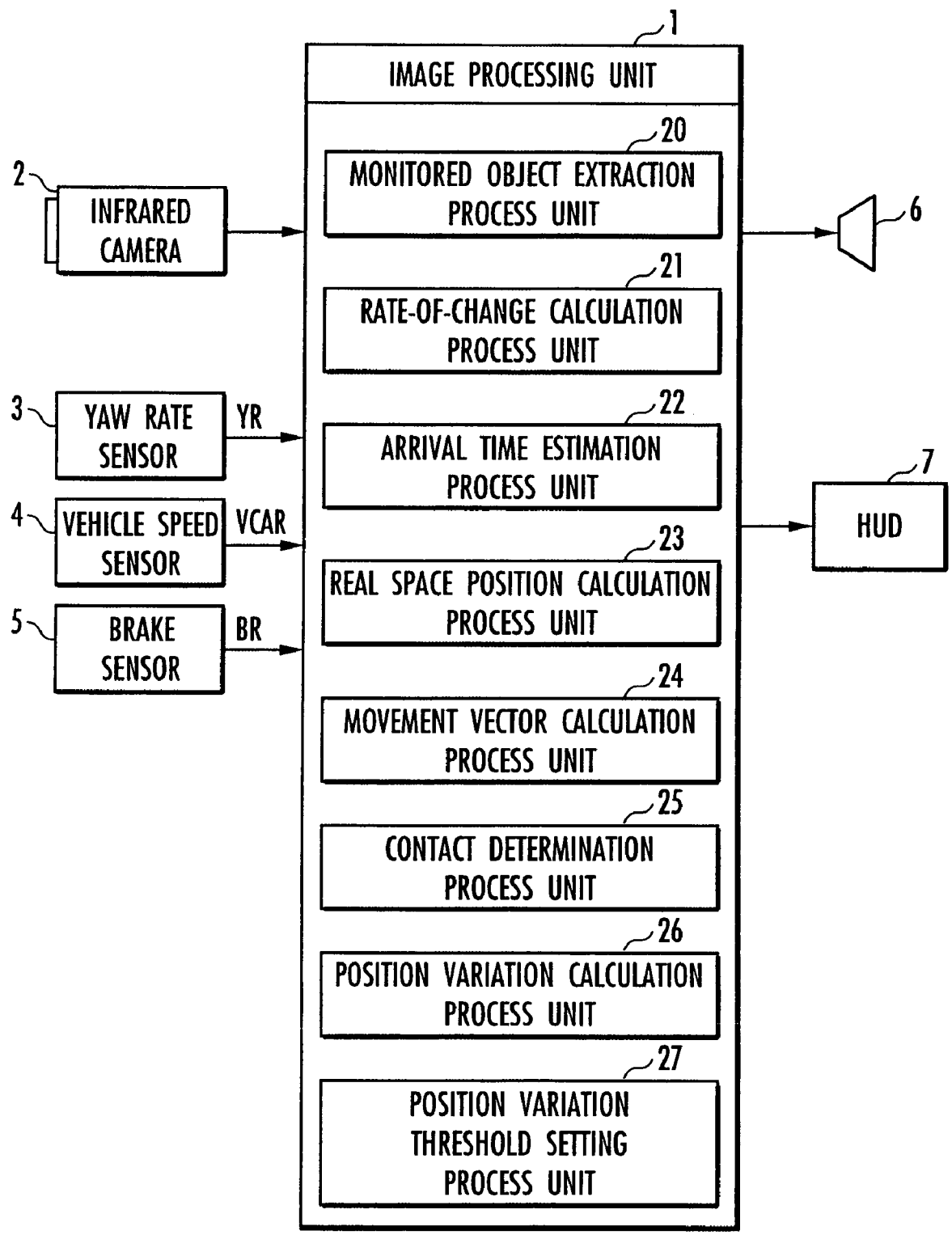
FIG. 1 is a configuration diagram showing a vehicle surroundings monitoring apparatus according to the present invention.
Figure 2:
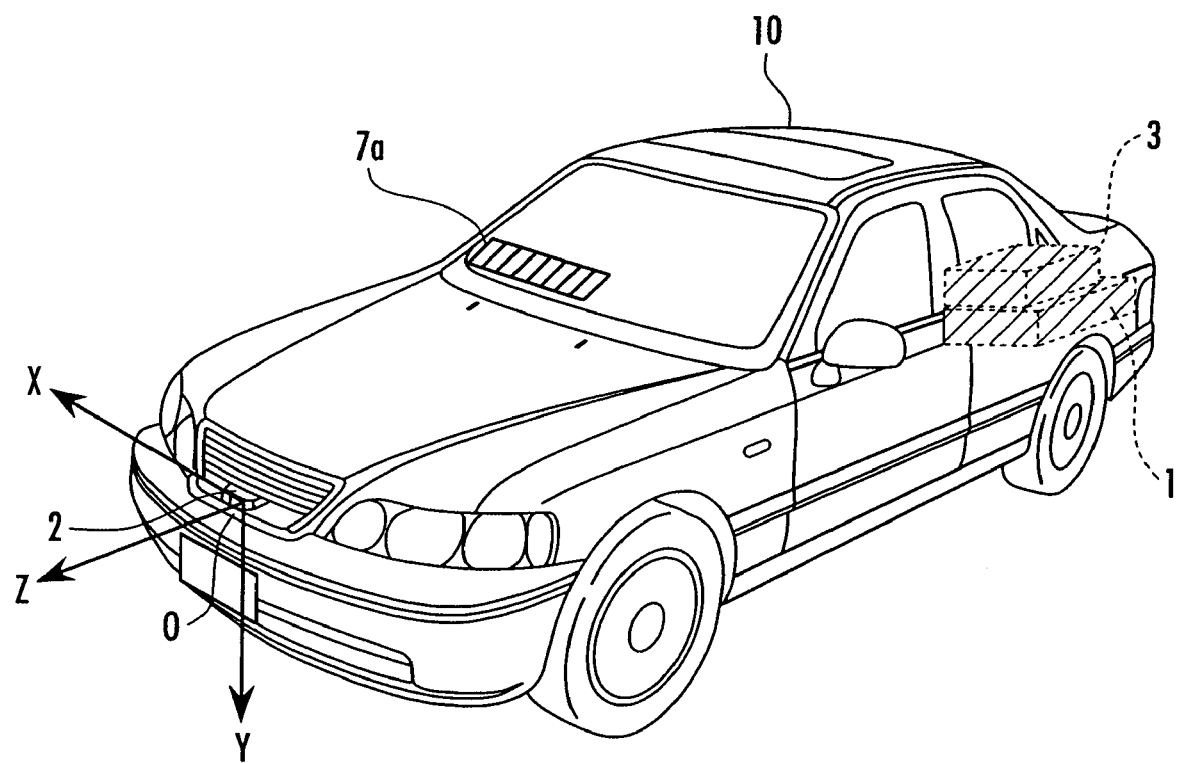
FIG. 2 is an explanatory diagram showing a mounting location of the vehicle surroundings monitoring apparatus shown in FIG. 1 on the vehicle.
Figure 4:
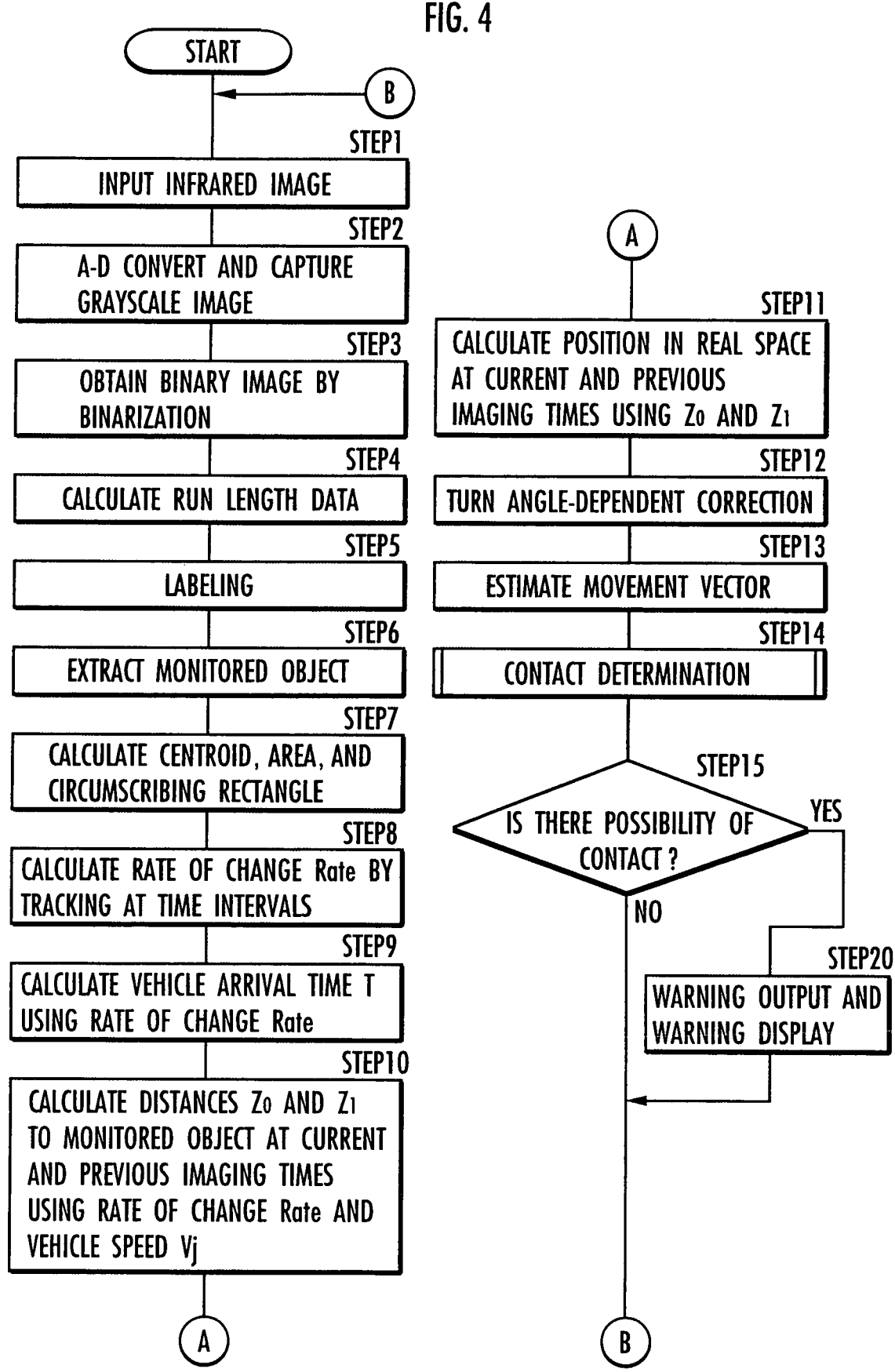
FIG. 4 is a flowchart showing a processing procedure according to a second embodiment of the present invention.
Figure 6:
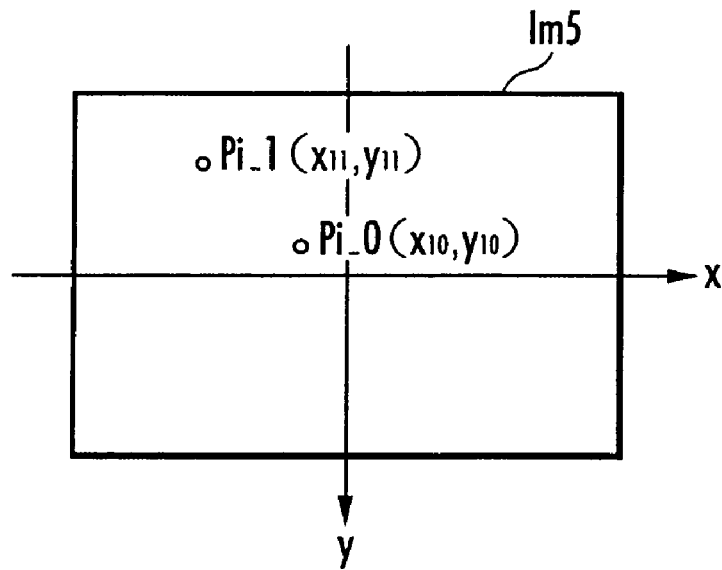
FIG. 6 is an explanatory diagram showing an estimation process of a movement vector of the monitored object in a real space.
Figure 6:
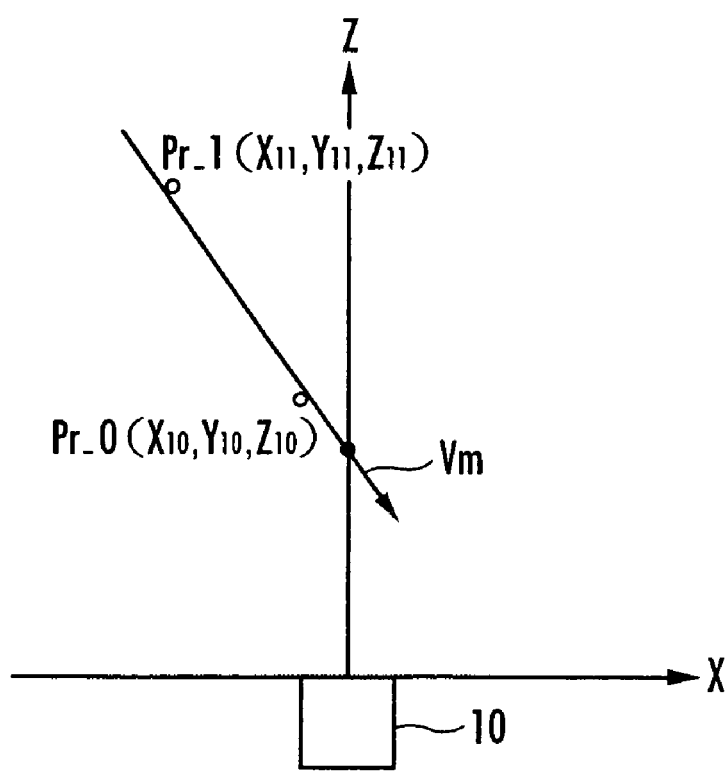
Figure 7:
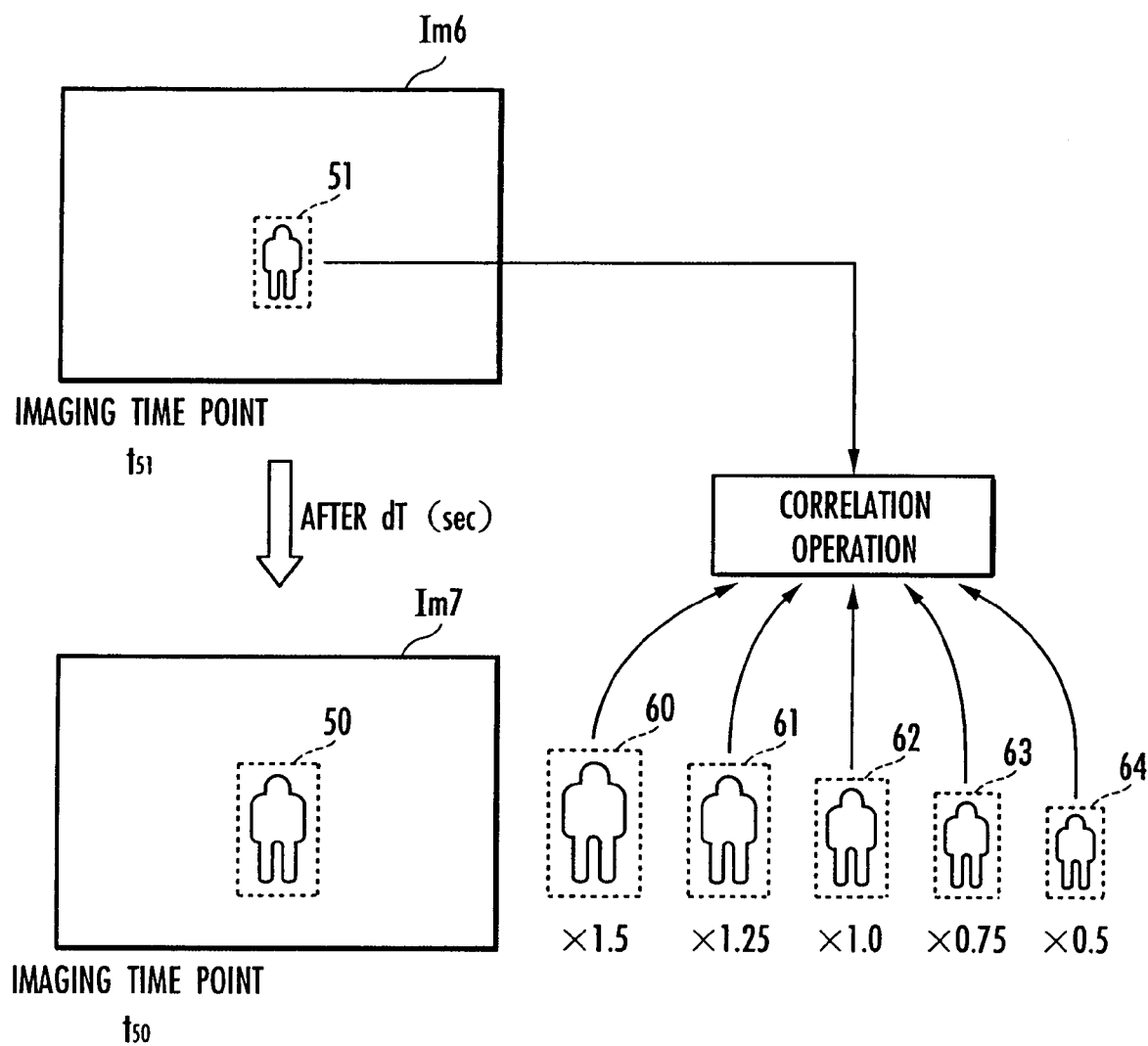
FIG. 7 is an explanatory diagram showing a method of calculating a rate of change in size of an image of the monitored object by a correlation operation between images.
Figure 8:
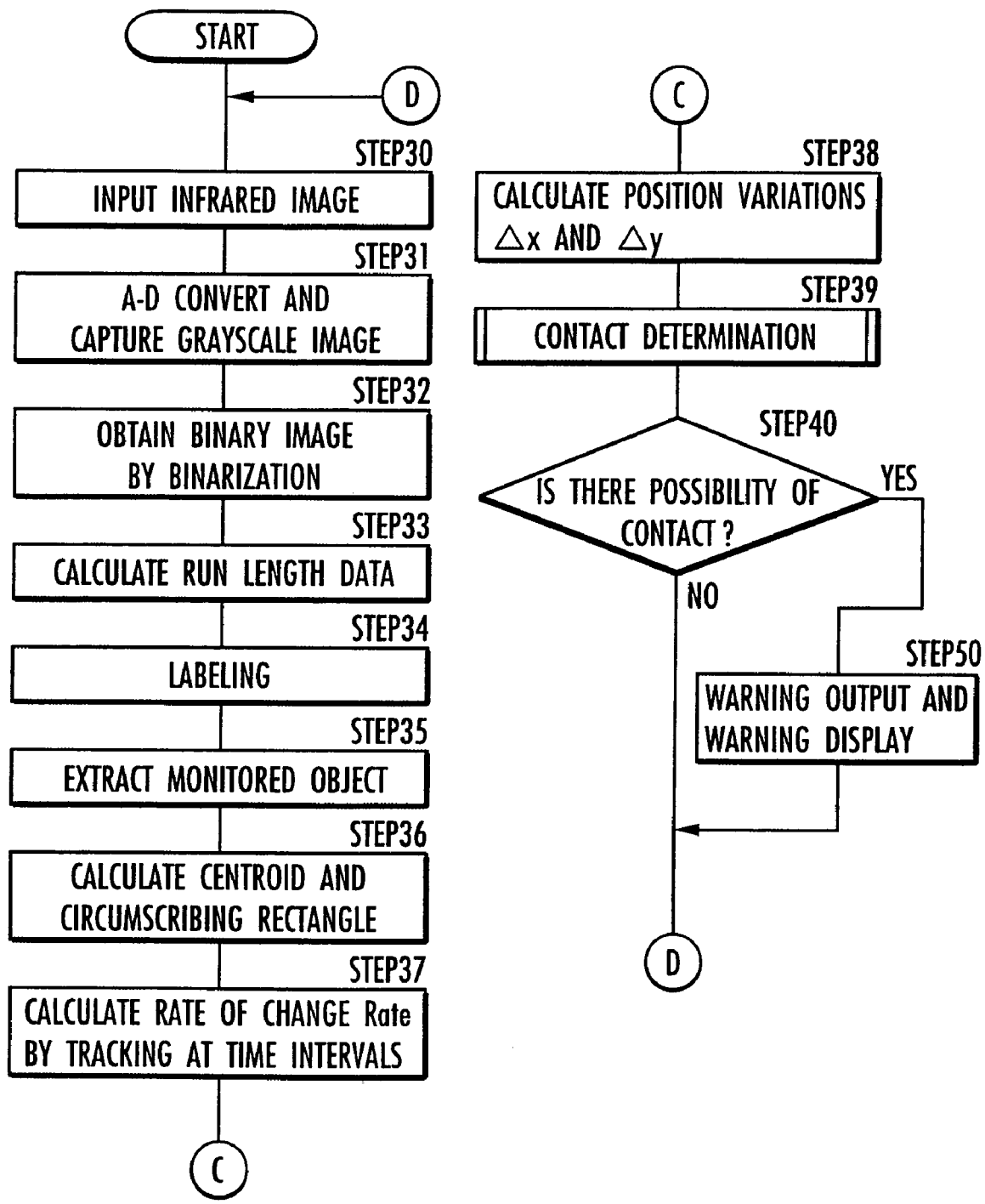
FIG. 8 is a flowchart showing a processing procedure according to a third embodiment of the present invention.
Figure 9:
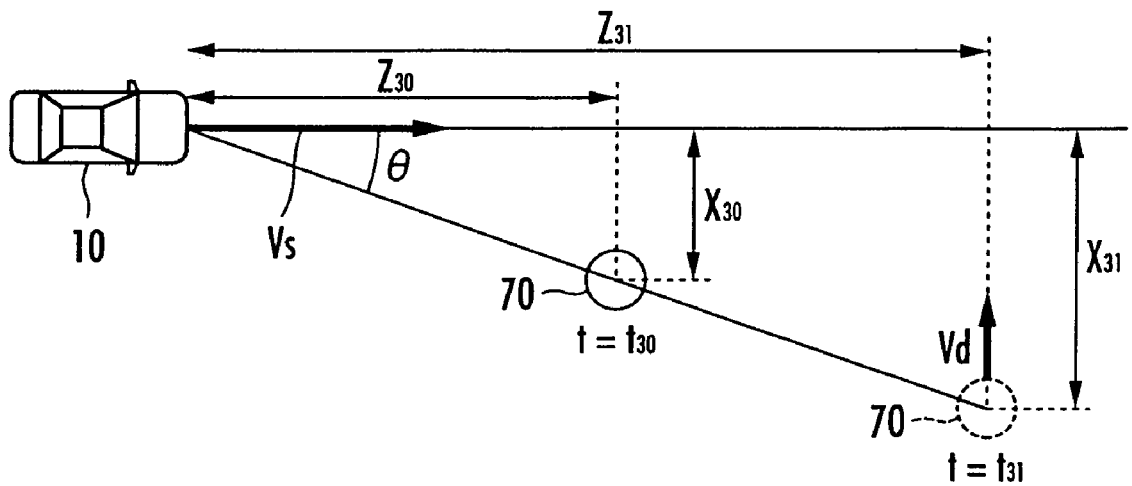
FIG. 9 is an explanatory diagram showing a contact determination process using position variations.
Figure 9:
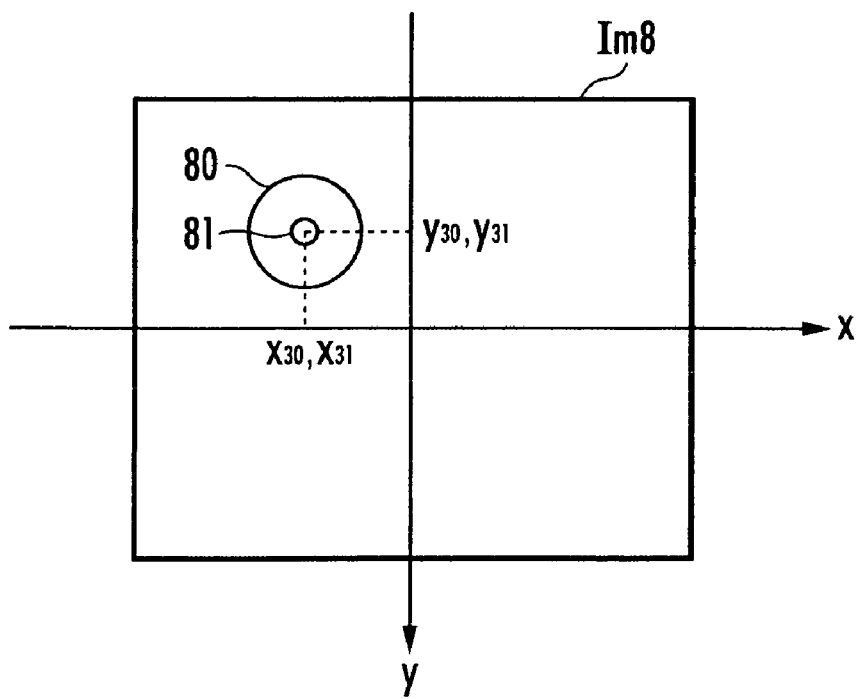
Figure 10:
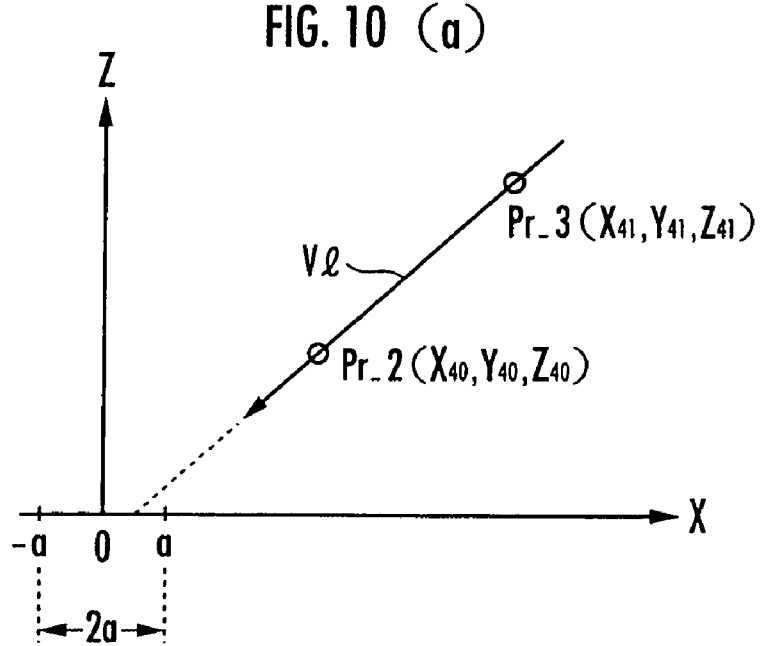
FIG. 10 is an explanatory diagram showing a setting process of position variation thresholds.
Figure 10:
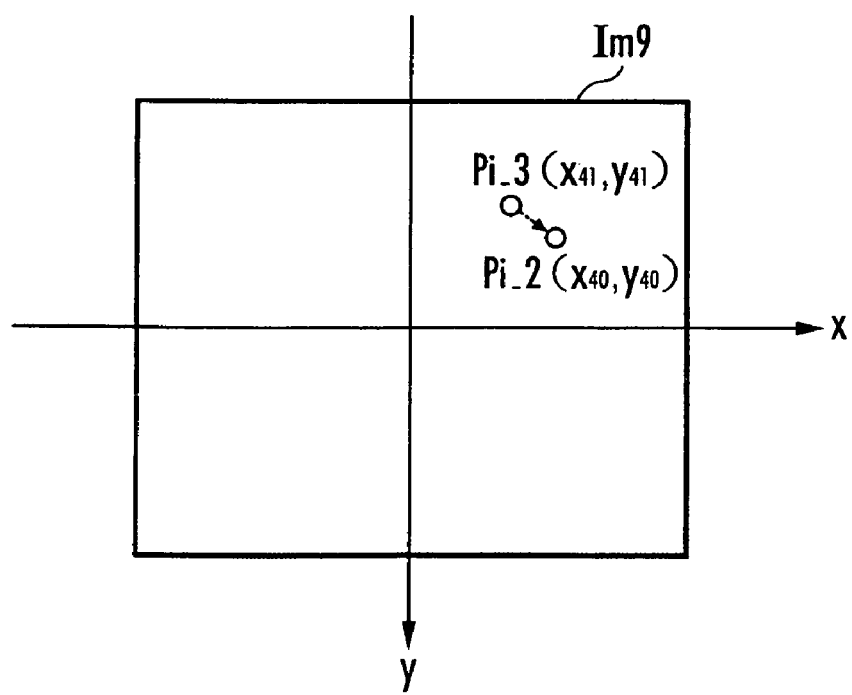

A preferred embodiment of the present invention will now be described hereinafter with reference to the FIG. 1 to FIG. 10. FIG. 1 is a configuration diagram showing a vehicle surroundings monitoring apparatus according to the present invention; FIG. 2 is an explanatory diagram showing a mounting location of the vehicle surroundings monitoring apparatus shown in FIG. 1 on the vehicle; FIG. 3 is an explanatory diagram showing a change in size of an image portion of a monitored object; FIG. 4 is a flowchart showing a processing procedure of an image processing unit according to a second embodiment shown in FIG. 1; FIG. 5 is an explanatory diagram showing tracking of the monitored object at time intervals; FIG. 6 is an explanatory diagram showing an estimation process of a movement vector of the monitored object in a real space; FIG. 7 is an explanatory diagram showing a method of calculating a rate of change in size of an image of the monitored object by a correlation operation between images; FIG. 8 is a flowchart showing a processing procedure of the image processing unit according to a third embodiment shown in FIG. 1; FIG. 9 is an explanatory diagram of a contact determination process using a position variation; and FIG. 10 is an explanatory diagram of a setting process of the position variation threshold value.

Referring to FIG. 1, the vehicle surroundings monitoring apparatus according to the present invention includes an image processing unit 1, an infrared camera 2 (corresponding to the camera of the present invention) capable of detecting a far infrared ray, a yaw rate sensor 3 which detects a yaw rate of the vehicle, a vehicle speed sensor 4 which detects a traveling speed of the vehicle, a brake sensor 5 which detects a driver's brake manipulated variable, an image processing unit 1 which detects a monitored object (an animal or the like) ahead of the vehicle from an image obtained by the infrared camera 2 and outputs warning when there is a high possibility of contact between the monitored object and the vehicle, a loudspeaker 6 for use in generating a voice alarm, and a head up display (hereinafter, referred to as HUD) 7 which displays the image obtained by the infrared camera 2 and provides a display for use in causing a driver to visually identify a monitored object at high risk of contact with the vehicle.

Referring to FIG. 2, the infrared camera 2 located in the front of the vehicle 10 has a characteristic that its output level becomes higher (the luminance increases) as the temperature of an imaged object rises. The HUD 7 is disposed in such a way that a screen 7a appears in a forward position of the driver's seat on the front window of the vehicle 10.

The image processing unit 1 is an electronic unit including an image input circuit which converts an analog image signal output from the infrared camera 2 to digital data and captures the digital data into an image memory and a computer (an arithmetic processing circuit including a CPU, a memory, I/O circuits and the like or a microcomputer in which these functions are collected intensively) which performs various arithmetic processing operations for the image of a view ahead of the vehicle captured in the image memory, having an interface circuit for accessing (reading and writing) image data captured in the image memory.

Referring to FIG. 1, the image processing unit 1 includes a monitored object extraction process unit 20 which extracts an image portion of the monitored object from the image of the view ahead of the vehicle, a rate-of-change calculation process unit 21 which calculates a rate of change Rate in size of the image portion of an identical monitored object between images taken at predetermined time intervals, an arrival time estimation process unit 22 which estimates the time to arrival of the monitored object at the vehicle 10 (the vehicle arrival time according to the present invention) T by using the rate of change Rate, a real space position calculation process unit 23 which calculates a position of the monitored object in the real space, a movement vector calculation process unit 24 which calculates a movement vector of the monitored object in the real space, a contact determination process unit 25 which determines whether there is a possibility of contact between the monitored object and the vehicle 10 based on the movement vector, a position variation calculation process unit 26 which calculates position variations $\Delta x$ and $\Delta y$ of the image portion of the identical monitored object between images taken at the predetermined time intervals, and a position variation threshold setting process unit 27 which sets position variation threshold values Thx and Thy for determining the possibility of contact based on the position variations $\Delta x$ and $\Delta y$.

The monitored object extraction process unit 20, the rate-of-change calculation process unit 21, and the arrival time estimation process unit 22 are configured by causing the computer provided in the image processing unit 1 to execute a vehicle surroundings monitoring program according to the present invention. Moreover, the real space position calculation process unit 23, the movement vector calculation process unit 24, the contact determination process unit 25, the position variation calculation process unit 26, and the position variation threshold setting process unit 27 are configured by causing the computer provided in the image processing unit 1 to execute a contact possibility determination program.

Furthermore, the monitored object extraction process unit 20 performs a monitored object extraction step of a vehicle surroundings monitoring method according to the present invention, the rate-of-change calculation process unit 21 performs a rate-of-change calculation step of the vehicle surroundings monitoring method according to the present invention, and the arrival time estimation process unit 22 performs an arrival time estimation step of the vehicle surroundings monitoring method according to the present invention.

First Embodiment

The following describes a method of estimating the time to arrival at the vehicle 10 of the object monitored by the image processing unit 1 according to the first embodiment of the present invention with reference to FIG. 3. In FIG. 3, Im1 designates an image taken by the infrared camera 2 at an imaging time point $t_{11}$ and Im2 designates an image taken by the infrared camera 2 at a time point $t_{10}$ which is a time interval dT (corresponding to the predetermined time interval according to the present invention) later than the time point $t_{11}$.

Im1 includes an image portion 31 of a pedestrian as a monitored object and Im2 includes an image portion 30 of the identical pedestrian. Referring to FIG. 3, there is shown a situation in which the pedestrian is walking toward the vehicle 10. The width $w_{10}$ of the image portion 30 of the pedestrian in Im2 is greater than the width $w_{11}$ of the image portion 31 of the pedestrian in Im1 since the pedestrian comes closer to the vehicle at the imaging time point $t_{10}$ in Im2 than at the imaging time point $t_{11}$ in Im1.

In this situation, the rate of change Rate and the time to arrival of the monitored object at the vehicle 10 (the vehicle arrival time) T have a relation expressed by an equation (1) shown below. Therefore, the vehicle arrival time T can be calculated from the rate of change Rate by using an equation (2) shown below.

[Eq. 1]

$$\text{Rate} = \frac{w_{11}(\text{previous time})}{w_{10}(\text{current time})} = \frac{f \cdot W / Z_1}{f \cdot W / Z_0} \quad (1)$$
$$= \frac{Z_0}{Z_1} = \frac{Z_0}{Z_0 + V_s \cdot dT}$$

-continued $$= \frac{Vs \cdot T}{Vs \cdot T + Vs \cdot dT}$$

$$= \frac{1}{1 + dT/T}$$

where $w_{10}$ is the width of the image portion of the monitored object at the current imaging time (the imaging time point $t_{10}$), $w_{11}$ is the width of the image portion of the monitored object at the previous imaging time (the imaging time point $t_{11}$), f is the focal length of the infrared camera 2, W is the width of the monitored object in the real space, $Z_0$ is a distance from the vehicle 10 to the monitored object at the current imaging time (the imaging time point $t_{10}$), $Z_1$ is a distance from the vehicle 10 to the monitored object at the previous imaging time (the imaging time point $t_{11}$), Vs is a relative speed between the vehicle and the monitored object, dT is the imaging interval, and T is the vehicle arrival time.

[Eq. 2]

$$T = \frac{dT \cdot \text{Rate}}{1 - \text{Rate}} \quad (2)$$

where T is the vehicle arrival time, dT is the imaging interval, and Rate is the rate of change.

Second Embodiment

Subsequently, an execution procedure for a contact determination process between the monitored object and the vehicle 10 performed by the image processing unit 1 according to a second embodiment of the present invention will be described with reference to a flowchart shown in FIG. 4. The image processing unit 1 inputs an image signal, which is output from the infrared camera 2 in step 1, first, and then captures a grayscale image converted from the image signal to digital tone (luminance) data into the image memory in step 2. In the next step 3, the image processing unit 1 obtains a binary image by binarization in which a value of "1" (white) is set if the luminance value of a pixel is a predetermined threshold value or greater and a value of "0" (black) is set otherwise for each pixel of the grayscale image.

The subsequent steps 4 to 6 correspond to processes performed by the monitored object extraction process unit 20. The monitored object extraction process unit 20 calculates run length data in each white area of the binary image in step 4 and performs a labeling process in which the areas overlapping in the horizontal direction are regarded as one object and it is labeled in step 5.

Thereafter, in the next step 6, the image processing unit 1 extracts an area (corresponding to the image portion of the monitored object according to the present invention) determined to correspond to the monitored object from the labeled area. In step 7, the image processing unit 1 calculates a centroid G and area S of the extracted area and the aspect ratio (ASPECT) of a rectangle circumscribing the extracted area.

The processes in steps 4 to 6 correspond to the object extraction step of the vehicle surroundings monitoring method according to the present invention.

The next step 8 is a process performed by the rate-of-change calculation process unit 21. The rate-of-change calculation process unit 21 tracks areas corresponding to identical monitored objects between a binary image Im3 of the previous (imaging time point $t_{21}$) taken image and a binary image Im4 of the current (imaging time point $t_{20}$) taken image as shown in FIG. 5. More specifically, it performs a tracking process of determining that areas satisfying the following requirements (a) to (c) are those corresponding to the identical monitored objects:

If $(x_{21}, y_{21})$ are the centroid position coordinates of an area 41 corresponding to the monitored object in the binary image Im3 of the previous (imaging time point $t_{21}$) taken image and $(x_{20}, y_{20})$ are the centroid position coordinates of an area 40 corresponding to the monitored object in the binary image of the current (imaging time point $t_{20}$) taken image, the relations expressed by the following equation (3) and equation (4) are satisfied:

[Eq. 3]

$$|x_{20} - x_{21}| < \Delta x \quad (3)$$

where $\Delta x$ is a tolerance for a movement in the image in the x direction (horizontal direction).

[Eq. 4]

$$|y_{20} - y_{21}| < \Delta y \quad (4)$$

where $\Delta y$ is a tolerance for a movement in the image in the y direction (vertical direction).

(b) If $S_{21}$ is the area of the area 41 corresponding to the monitored object in the binary image Im3 of the previous (imaging time point $t_{21}$) taken image and $S_{20}$ is the area of the area 40 corresponding to the monitored object in the binary image Im4 of the current (imaging time point $t_{20}$) taken image, the relation expressed by the following equation (5) is satisfied:

[Eq. 5]

$$\frac{S_{20}}{S_{21}} < 1 \pm \Delta S \quad (5)$$

where $\Delta S$ is a tolerance for a change in area.

(c) If $AS_{21}$ is the aspect ratio of the area 41 corresponding to the monitored object in the binary image Im3 of the previous (imaging time point $t_{21}$) taken image and $AS_{20}$ is the aspect ratio of the area 40 corresponding to the monitored object in the binary image Im4 of the current (imaging time point $t_{20}$) taken image, the relation expressed by the following equation (6) is satisfied:

[Eq. 6]

$$\frac{AS_{20}}{AS_{21}} < 1 \pm \Delta AS \quad (6)$$

where $\Delta AS$ is a tolerance for a change in aspect ratio.

The rate-of-change calculation process unit 21 determines that the area 41 and the area 40 correspond to the identical monitored objects when the above (a) to (c) relations are satisfied regarding the area 41 corresponding to the monitored object in the binary image Im3 of the previous (imaging time point $t_{21}$) taken image and the area 40 corresponding to the monitored object in the binary image Im4 of the current (imaging time point $t_{20}$) taken image. Thereafter, the rate-of-change calculation process unit 21 calculates the rate of change Rate by dividing the width $w_{21}$ of the extracted area 41 by the width $w_{20}$ of the extracted area 40 according to the above equation (1).

The process in step 8 corresponds to the rate-of-change calculation step of the vehicle surroundings monitoring method according to the present invention.

The next step 9 is a process performed by the arrival time estimation process unit 22. The arrival time estimation process unit 22 calculates the vehicle arrival time T by using the rate of change Rate according to the above equation (2).

The process in step 9 corresponds to the arrival time estimation step of the vehicle surroundings monitoring method according to the present invention.

Step 10 is a process performed by the real space position calculation process unit 23. The real space position calculation process unit 23 calculates the distance $Z_0$ to the current monitored object according to the following equation (8) obtained by replacing the relative speed Vs (=vehicle traveling speed Vj+monitored object moving speed Vd) between the vehicle 10 and the monitored object with the traveling speed Vj of the vehicle 10 assuming that the traveling speed Vj of the vehicle 10 is sufficiently higher than the moving speed Vd of the monitored object in the following equation (7) derived from the above equation (1) and then transforming the equation:

[Eq. 7]

$$\text{Rate} = \frac{Z_0}{Z_0 + Vs \cdot dT} \quad (7)$$

where Rate is the rate of change, $Z_0$ is the distance to the monitored object at the current imaging time, Vs is the relative speed between the vehicle and the monitored object, and dT is the imaging interval.

[Eq. 8]

$$Z_0 = \frac{\text{Rate} \cdot Vj \cdot dT}{1 - \text{Rate}} \quad (8)$$

where $Z_0$ is the distance to the monitored object at the current time, Rate is the rate of change, Vj is the traveling speed of the vehicle, and dT is the imaging interval.

Moreover, the real space position calculation process unit 23 calculates the distance $Z_1$ to the monitored object at the previous imaging time according to the following equation (9):

[Eq. 9]

$$Z_1 = Z_0 + Vj \cdot dT \quad (9)$$

where $Z_1$ is the distance to the monitored object at the previous imaging time, $Z_0$ is the distance to the monitored object at the current imaging time, Vj is the traveling speed of the vehicle, and dT is the imaging interval.

The real space position calculation process unit 23 calculates the distance $Z_0$ from the vehicle 10 to the monitored object at the current imaging time and the distance $Z_1$ from the vehicle 10 to the monitored object at the previous imaging time according to the above equation (8) and equation (9).

Then, in the next step 11, the real space position calculation process unit 23 calculates a real space position of the monitored object at the current and previous imaging times from the position of the area corresponding to the monitored object in the current and previous binary images.

It should be noted that FIG. 6(*a*) shows a current extracted position Pi_0 ($x_{10}$, $y_{10}$) of the monitored object and a previous extracted position Pi_1 ($x_{11}$, $y_{11}$) of the monitored object in a binary image Im5, with the axis of ordinate y being set in the vertical direction of the image and the axis of abscissa x being set in the horizontal direction.

FIG. 6(*b*) shows a situation of the monitored object moving in the real space, with the Z axis being set in the traveling direction of the vehicle 10 and the X axis being set in the direction perpendicular to the Z axis. Furthermore, in this figure, Pr_0 ($X_{10}$, $Y_{10}$, $Z_{10}$) indicates a position of the monitored object at the current imaging time and Pr_1 ($X_{11}$, $Y_{11}$, $Z_{11}$) indicates a position of the monitored object at the previous imaging time. Vm is a movement vector of the monitored object estimated from Pr_0 and Pr_1.

The real space position calculation process unit 23 calculates the real space coordinates Pr_0 ($X_{10}$, $Y_{10}$, $Z_{10}$) of the monitored object at the current imaging time according to the following equation (10) and the real space coordinates Pr_1 ($X_{11}$, $Y_{11}$, $Z_{11}$) of the monitored object at the previous imaging time according to the following equation (11) in step 11:

[Eq. 10]

$$\begin{cases} X_{10} = \dfrac{x_{10} \cdot Z_0}{f} \\ Y_{10} = \dfrac{y_{10} \cdot Z_0}{f} \end{cases} \quad (10)$$

where $X_{10}$ and $Y_{10}$ are the real space coordinate values of the monitored object at the current imaging time, $x_{10}$ and $y_{10}$ are the image coordinate values of the area corresponding to the monitored object in the binary image at the current taken image, $Z_0$ is the distance from the vehicle to the monitored object at the current imaging time, and f is a focal length of the infrared camera,

[Eq. 11]

$$\begin{cases} X_{11} = \dfrac{x_{11} \cdot Z_1}{f} \\ Y_{11} = \dfrac{y_{11} \cdot Z_1}{f} \end{cases} \quad (10)$$

where $X_{11}$ and $Y_{11}$ are the real space coordinate values of the monitored object at the previous imaging time, $x_{11}$ and $y_{11}$ are the image coordinate values of the area corresponding to the monitored object in the binary image at the previous taken image, $Z_1$ is the distance from the vehicle to the monitored object at the previous imaging time, and f is the focal length of the infrared camera.

In addition, in the next step 12, the real space position calculation process unit 23 performs a turn angle-dependent correction to correct positional displacement on the image due to turning of the vehicle 10 based on an angle of turn recognized from a detection signal YR of the yaw rate sensor 3. More specifically, if θr is the angle of turn of the vehicle 10 between the previous imaging time and the current imaging time, the real space coordinate values are corrected according to the following equation (12):

[Eq. 12]
$$\begin{bmatrix} Xr \\ Yr \\ Zr \end{bmatrix} = \begin{bmatrix} \cos\theta r & 0 & -\sin\theta r \\ 0 & 1 & 0 \\ \sin\theta r & 0 & \cos\theta r \end{bmatrix} \begin{bmatrix} Xo \\ Yo \\ Zo \end{bmatrix} \quad (12)$$

where Xr, Yr, and Zr are the real space coordinate values after the turn angle-dependent correction, θr is the angle of turn, and $X_0$, $Y_0$, and $Z_0$ are the real space coordinate values before the turn angle-dependent correction.

The next step 13 is a process performed by the movement vector calculation process unit 24. The movement vector calculation process unit 24 calculates an approximate straight line Vm corresponding to the relative movement vector between the monitored object and the vehicle 10 from the real space position Pr_1 at the previous imaging time and the real space position Pr_0 at the current imaging time of the identical monitored object as shown in FIG. 6(b). The relative movement vector can also be calculated by using the real space position of the monitored object at a past plurality of time points. For a specific calculation process of the approximate straight line, a method disclosed in the above Japanese Patent Laid-Open No. 2001-6096 is used.

The relative movement vector is found by calculating the approximate straight line which approximates a relative movement track of the monitored object with respect to the vehicle 10 as described above to determine whether the movement vector crosses the Z axis, by which it is possible to predict the possibility of contact between the vehicle and the monitored object with more accuracy, reducing the effect of position detection errors.

The next steps 14, 15, and 20 are processes performed by the contact determination process unit 25. The contact determination process unit 25 calculates the relative speed Vs in the Z direction (in the traveling direction of the vehicle 10) according to an equation (13) shown below in step 15. Then, the contact determination process unit 25 determines whether there is a possibility of contact between the vehicle and the monitored object according to the following equations (14) and (15):

[Eq. 13]
$$Vs = \frac{Z_{11} - Z_{10}}{dT} \quad (13)$$

where Vs is the relative speed between the monitored object and the vehicle, $Z_{11}$ is a real space coordinate value in the Z direction at the previous imaging time, $Z_{10}$ is a real space coordinate value in the Z direction at the current imaging time, and dT is the imaging interval,

[Eq. 14]
$$\frac{Z_{10}}{Vs} \leq T1 \quad (14)$$

where $Z_{10}$ is the real space coordinate value of the monitored object in the Z direction at the current imaging time, Vs is the relative speed between the monitored object and the vehicle, and T1 is a threshold value for time to contact.

[Eq. 15]
$$|Y_{10}| \leq H1 \quad (15)$$

where $Y_{10}$ is a real space coordinate value of the monitored object in the Y direction (height direction) at the current imaging time and H1 is a threshold value for the height.

It should be noted that T1 in the above equation (14) is set with intention to determine whether there is a possibility of contact at the time T1 earlier than the predicted contact time and, for example, it is set to a value on the order of two to five seconds. In addition, H1 in the above equation (15) regulates the range in the height direction and, for example, it is set to a value on the order of twice the vehicle height of the vehicle 10.

The contact determination process unit 25 determines that there is a possibility of contact if both of the relations of the above equations (14) and (15) are satisfied and determines that there is no possibility of contact if one of the equations (14) and (15) is not satisfied. If it determines that there is a possibility of contact, the contact determination process unit 25 proceeds from the next step 15 to step 20, where the contact determination process unit 25 outputs a warning sound by a loudspeaker 6 and produces a warning display by the HUD 7, and thereafter it returns to step 1. On the other hand, if the contact determination process unit 25 determines that there is no possibility of contact, it proceeds from step 16 to step 1, without outputting the warning sound by the loudspeaker 6 and producing the warning display by the HUD 7.

While the rate-of-change calculation process unit 21 calculates the rate of change Rate by tracking the identical monitored object at time intervals between binary images shown in FIG. 5 in this embodiment, the rate of change Rate can also be calculated by a correlation operation of the image portions of the monitored object shown in FIG. 7. Referring to FIG. 7, Im6 and 51 designate a grayscale image and an image portion of the monitored object, respectively, at the previous imaging time. In addition, Im7 and 50 designate a grayscale image and an image portion of the monitored object, respectively, at the current imaging time.

Moreover, the rate-of-change calculation process unit 21 calculates a correlation degree with the image portion 51 of the monitored object at the previous imaging time by reducing (if the monitored object is getting close to the vehicle) or enlarging (if the monitored object is getting away from the vehicle) the size of the image portion 50 of the monitored object in the current grayscale image Im7 by affine transformation.

More specifically, as shown, it calculates the correlation degree between an image 60, an image 61, an image 62, an image 63, or an image 64 obtained by multiplying the image portion 50 by 1.5, 1.25, 1.0, 0.75, or 0.5, respectively, and the image portion 51. Thereafter, the rate-of-change calculation process unit 21 determines the magnification of the image portion 50 at the highest correlation degree as a rate of change Rate.

While it is determined whether there is a possibility of contact between the monitored object and the vehicle 10 by estimating the vehicle arrival time T, which is the time when the monitored object arrives at the vehicle, in step 9 shown in FIG. 4 and it is determined whether there is a possibility of contact between the monitored object and the vehicle 10 by calculating the movement vector of the monitored object in the real space in step 14 in this embodiment, it is also possible to determine whether there is a possibility of contact between the monitored object and the vehicle according to one of these determinations.

Furthermore, it is also possible to monitor the surroundings of the vehicle directly by using the vehicle arrival time T estimated in step 9 in FIG. 4. For example, when the vehicle arrival time T decreases to a predetermined lower limit time or less, a warning can be given to the driver.

Third Embodiment

The following describes an execution procedure for the contact determination process between the monitored object and the vehicle 10 performed by the image processing unit 1 according to a third embodiment of the present invention with reference to a flowchart shown in FIG. 8. Processing of step 30 to step 37 in FIG. 8 is similar to the above processing of step 1 to step 8 in FIG. 4. In step 37, the rate-of-change calculation process unit 21 calculates the rate of change Rate.

The next step 38 is performed by the position variation calculation process unit 26. The position variation calculation process unit 26 calculates the position variations Δx (horizontal direction) and Δy (vertical direction) of the image portion of the identical monitored object in the plurality of images used in the tracking at time intervals of step 37. Processing of the next step 39 to step 40 and step 50 is performed by the contact determination process unit 25. The contact determination process unit 25 determines whether there is the possibility of contact between the vehicle 10 and the monitored object according to whether both of the following condition 1 and condition 2 are satisfied in step 39.

Condition 1: The area of the image portion in the current image is larger than the previous image regarding the identical monitored object. In other words, the monitored object and the vehicle 10 are coming close to each other. The contact determination process unit 25 determines whether the condition 1 is satisfied by the following equation (16):

[Eq. 16]

$$\text{Rate} = \frac{s0(\text{previous area})}{s1(\text{current area})} < 1 \tag{16}$$

Condition 2: The position of the image portion of the identical monitored object does not change almost at all between the taken images when the rate of change Rate is calculated. In other words, the image portion remains at rest in the image, regardless of the time being elapsed. The contact determination process unit 25 determines whether the condition 2 is satisfied by the following equations (17) and (18):

[Eq. 17]

$$\Delta x = |x_0 - x_1| < Thx \tag{17}$$

[Eq. 18]

$$\Delta y = |y_0 - y_1| < Thy \tag{18}$$

where $(x_0, y_0)$ is the centroid position of the image portion of the monitored object in the current image, Thx is the position variation threshold value in the x direction, $(x_1, y_1)$ is the centroid position of the image portion of the identical monitored object in the previous image, and Thy is the position variation threshold value in the y direction.

The above condition 2 will be described here with reference to FIG. 9(a) and FIG. 9(b). FIG. 9(a) shows a situation where the monitored object 70 is coming close to the vehicle 10 at relative speed Vs in the traveling direction (Z direction) of the vehicle 10 and at approach speed Vd in the direction (X direction) perpendicular to the traveling direction. It shows a real space position $(X_{31}, Z_{31})$ of the monitored object 70 at the time point $t_{31}$ (the previous imaging timing) and a real space position $(X_{30}, Z_{30})$ of the monitored object 70 at the time point $t_{30}$ (the current imaging timing) when a time interval dT (imaging interval) has elapsed from $t_{31}$.

In FIG. 9(a), the driver of the vehicle 10 sees the monitored object 70 in a direction θ expressed by the following equation (19). Moreover, if the monitored object 70 is to come into contact with the vehicle 10, θ stays constant even after an elapse of time.

[Eq. 19]

$$\theta = \tan^{-1}\left(\frac{Vd}{Vs}\right) \tag{19}$$

The following equation (20) is satisfied since θ is constant:

[Eq. 20]

$$\frac{Vd \cdot \Delta T}{Vs \cdot \Delta T} = \frac{X_{31}}{Z_{31}} = \frac{X_{30}}{Z_{30}} \tag{20}$$

where ΔT is an elapsed time.

Referring to FIG. 9(b), there is shown the situation of FIG. 9(a) in an image Im8 using perspective transformation of equation (21) and equation (22) shown below. In FIG. 9(b), reference numerals 80 and 81 designate the image portion of the monitored object 70 at the time point $t_{31}$ and the image portion of the monitored object 70 at the time point $t_{30}$, respectively.

The relation between the Y direction (the height direction of the vehicle 10) in the real space and the Z direction is the same as the relation between the X direction and the Z direction. It is possible to obtain the position $y_{30}$ in the image of the monitored object 70 at the time point $t_{30}$ relative to the real space position $Y_{30}$ and the position $y_{31}$ in the image of the monitored object 70 at the time point $t_{31}$ relative to the real space position $Y_{31}$.

[Eq. 21]

$$x_{30} = f\frac{X_{30}}{Z_{30}} \tag{21}$$

[Eq. 22]

$$x_{31} = f\frac{X_{31}}{Z_{31}} \tag{22}$$

where f=F (focal length of infrared camera)/(p (pixel pitch of taken image).

In the above equation (21) and equation (22), equation $x_{30}=x_{31}$ is satisfied since $X_{30}/Z_{30}$ in the right-hand side of the equation (21) equals $X_{31}/Z_{31}$ in the right-hand side of the equation (22) due to the above equation (20). Similarly, equation $y_{30}=y_{31}$ is satisfied in the Y direction. Therefore, in the situation where there is the possibility of contact between the vehicle 10 and the monitored object 70 as shown in FIG. 9(a), it is apparent that the centroid position of the current image portion 80 is the same as that of the previous image portion 81 regarding the monitored object 70 in the image as shown in FIG. 9(b). The above condition 2 is a condition for determining the possibility of contact between the vehicle 10 and the monitored object.

When using the above condition 1 and condition 2, it is possible to determine whether there is the possibility of contact between the vehicle 10 and the monitored object by simple arithmetic processing of calculating the rate of change Rate and the position variations Δx and Δy for the image portion of the identical monitored object in the plurality of taken images. Therefore, the calculation of the distance between the vehicle 10 and the monitored object and the estimation of the movement vector are unnecessary, though they are required in the above first embodiment.

Thereafter, when determining that both of the condition 1 and the condition 2 are satisfied and thereby there is the possibility of contact, the contact determination process unit 25 branches from step 40 to step 50 to output a warning sound using the loudspeaker 6 and to make a warning display using the HUD 7, and it then returns to step 30. On the other hand, when determining that at least one of the condition 1 and the condition 2 is not satisfied and thereby there is no possibility of contact, the contact determination process unit 25 proceeds from step 40 to step 30, without outputting the warning sound using the loudspeaker 6 and making the warning display using the HUD 7.

While the position variation threshold value Thx in the equation (17) and the position variation threshold value Thy in the equation (18) of the condition 2 can be fixed values based on the vehicle width and vehicle height of the vehicle 10, the position variation threshold setting process unit 27 can set them according to the distance between the vehicle 10 and the monitored object. The following describes the processing of setting the position variation threshold values Thx and Thy according to the distance between the vehicle 10 and the monitored object with reference to FIG. 10(a) and FIG. 10(b).

Note here that the distance between the vehicle 10 and the monitored object can be calculated by the equation (8) and the equation (9) in the first embodiment described above or can be detected by a ranging sensor (corresponding to the ranging process unit of the present invention) using radar or the like.

FIG. 10(a) shows a change in the position of the monitored object in a two-dimensional coordinate system in the real space with the origin located at the position of the vehicle 10, with the ordinate axis Z (in the traveling direction of the vehicle 10) and the abscissa axis X (the direction perpendicular to the Z axis or the width direction of the vehicle). In addition, Y corresponds to the vehicle height direction of the vehicle 10 (the direction perpendicular to the Z-X plane).

In FIG. 10(a), reference numeral 2a indicates a vehicle width of the vehicle 10; Pr_2 ($X_{40}$, $Y_{40}$, $Z_{40}$) indicates the coordinates in the real space at the current imaging timing of the monitored object; and Pr_3 ($X_{41}$, $Y_{41}$, $Z_{41}$) indicates the coordinates in the real space at the previous imaging timing of the monitored object. FIG. 10(b) shows coordinates Pi_2 ($x_{40}$, $y_{40}$) and Pi_3 ($x_{41}$, $y_{41}$) in the image Im9 corresponding to the coordinates Pr_2 ($X_{40}$, $Y_{40}$, $Z_{40}$) and Pr_3 ($X_{41}$, $Y_{41}$, $Z_{41}$) in the real space of the monitored object in FIG. 10(a), respectively. In FIG. 10(a), a straight line V1 passing through Pr_2 and Pr_3 is expressed by the following equation (23):

[Eq. 23]

$$X = \frac{X_{40} - X_{41}}{Z_{40} - Z_{41}}(Z - Z_{41}) + X_{41} \quad (23)$$

If the straight line V1 intersects the X axis in a range of −a to a, in other words, if condition |X|<a is satisfied with Z=0 in the equation (23), the vehicle 10 comes into contact with the monitored object. If 0 is therefore assigned to Z (Z=0) in the equation (23), the condition is represented by the following expression (24):

[Eq. 24]

$$\left| \frac{X_{41} \cdot Z_{40} - X_{40} \cdot Z_{41}}{Z_{40} - Z_{41}} \right| < a \quad (24)$$

where a is one-half of the width of the vehicle.

The following equation (27) is obtained by transforming the $X_{40}$ and $X_{41}$ in the equation (24) to the horizontal coordinates $x_{40}$ and $x_{41}$ in the image using inverse perspective transformation expressed by the following equation (25) and equation (26):

[Eq. 25]

$$X_{40} = \frac{x_{40} \cdot Z_{40}}{f} \quad (25)$$

where f=F (focal length of infrared camera)/p (pixel pitch of taken image).

[Eq. 26]

$$X_{41} = \frac{x_{41} \cdot Z_{41}}{f} \quad (26)$$

[Eq. 27]

$$\left| \frac{\frac{x_{41} \cdot Z_{41}}{f} Z_{40} - \frac{x_{40} \cdot Z_{40}}{f} Z_{41}}{Z_{40} - Z_{41}} \right| < a \quad (27)$$

The following expression (28) is obtained by arranging the above equation (27). Therefore, the position variation calculation process unit 26 sets the position variation threshold value Thx of the condition 2 for the right-hand side of the expression (28).

[Eq. 28]

$$|x_{41} - x_{40}| < f \cdot a \cdot \left( \frac{1}{Z_{41}} - \frac{1}{Z_{40}} \right) \quad (28)$$

where f=F (focal length of infrared camera)/p (pixel pitch of taken image) and a is one-half of the width of the vehicle.

Moreover, assuming that 2b is the vehicle height of the vehicle 10, the position variation threshold value Thy of the condition 2 can be set for the following expression (29)

regarding the possibility of contact in the Y direction, similarly to that of contact in the X direction described above:

[Eq. 29]

$$|y_{41} - y_{40}| < f \cdot b \cdot \left(\frac{1}{Z_{41}} - \frac{1}{Z_{40}}\right) \quad (29)$$

where f=F (focal length of infrared camera)/(p (pixel pitch of taken image) and b is one-half of the height of the vehicle.

As described above, the position variation threshold setting process unit 27 sets the position variation threshold values Thx and Thy based on the distance between the vehicle 10 and the monitored object, whereby the possibility of contact between the vehicle 10 and the monitored object can be determined assuming a moving trajectory of the monitored object represented by the straight line V1 shown in FIG. 10(*a*). This increases the accuracy of the contact determination performed by the contact determination process unit 25.

Fourth Embodiment

The following describes an execution procedure for the contact determination process between the monitored object and the vehicle 10 performed by the image processing unit 1 according to a fourth embodiment of the present invention. In the fourth embodiment, condition 3 described below is added to the condition 1 and the condition 2 in the third embodiment to determine the possibility of contact between the monitored object and the vehicle 10:

Condition 3: The time to arrival at the vehicle 10 of the monitored object (vehicle arrival time) T is equal to or less than a predetermined time. The contact determination process unit 25 determines whether the condition 3 is satisfied by the following expression (30):

[Eq. 30]

$$\text{Rate} \leq \frac{1}{1 + \frac{dT}{T}} \quad (30)$$

where Rate is the rate of change in area of the image portion of the monitored object calculated by the equation (16), dT is the imaging interval, and T is the vehicle arrival time (the predetermined time is assigned to this time).

The possibility of contact between the monitored object and the vehicle 10 is determined by adding the condition 3 as described above, whereby the contact determination process unit 25 can determine that there is a high possibility of contact between the monitored object and the vehicle only within the monitored objects in a high emergency situation where the time T to arrival at the vehicle 10 is equal to or less than the predetermined time.

While the infrared camera 2 is used as a camera according to the present invention in this embodiment, it is also possible to use a normal video camera capable of detecting only a visible light.

Furthermore, while the arrangement for imaging the view ahead of the vehicle has been shown in this embodiment, it is also possible to determine whether there is a possibility of contact with the monitored object by imaging a view behind the vehicle, a view to the side of the vehicle, or a view in any other direction.

What is claimed is:

1. A vehicle surroundings monitoring apparatus which detects a monitored object around a vehicle from images taken by a single camera mounted on the vehicle, said apparatus comprising:
    a monitored object extraction process unit which extracts an image portion of the monitored object from the image taken by the camera;
    a rate-of-change calculation process unit which calculates a rate of change in size of the image portion of an identical monitored object extracted by the monitored object extraction process unit from a plurality of images taken by the camera at predetermined time intervals; and
    an arrival time estimation process unit which estimates vehicle arrival time which is the time to arrival of the monitored object at the vehicle based on the rate of change;
    wherein the rate-of-change calculation process unit regards an image portion of the monitored object extracted from one of the plurality of images taken by the camera at the predetermined time intervals as a standard image, calculates a correlation degree with an image portion of the monitored object in the other image by enlarging or reducing the standard image at a predetermined ratio, and calculates an enlargement ratio or a reduction ratio of the standard image at the highest correlation degree as the rate of change.

2. A vehicle surroundings monitoring apparatus which detects a monitored object around a vehicle from images taken by a single camera mounted on the vehicle, comprising:
    a monitored object extraction process unit which extracts an image portion of the monitored object from the image taken by the camera;
    a rate-of-change calculation process unit which calculates a rate of change in size of the image portion of an identical monitored object extracted by the monitored object extraction process unit from a plurality of images taken by the camera at predetermined time intervals; and
    a contact determination process unit which determines whether there is a possibility of contact between the monitored object and the vehicle based on the rate of change;
    wherein the rate-of-change calculation process unit regards an image portion of the monitored object extracted from one of the plurality of images taken by the camera at the predetermined time intervals as a standard image, calculates a correlation degree with an image portion of the monitored object in the other image by enlarging or reducing the standard image at a predetermined ratio, and calculates an enlargement ratio or a reduction ratio of the standard image at the highest correlation degree as the rate of change.

3. A vehicle surroundings monitoring apparatus according to claim 2, further comprising an arrival time estimation process unit which estimates vehicle arrival time which is the time to arrival of the monitored object at the vehicle based on the rate of change, wherein the contact determination process unit determines whether there is a possibility of contact between the monitored object and the vehicle based on the vehicle arrival time.

4. A vehicle surroundings monitoring apparatus according to claim 2, further comprising:
    a speed sensor which detects a traveling speed of the vehicle; and
    a real space position calculation process unit which calculates a position of the monitored object in a real space by using a traveling speed detected by the speed sensor and the rate of change calculated by the rate-of change calculation process unit, wherein the contact determination process unit determines whether there is a possibility of contact between the monitored object and the vehicle based on the position of the monitored object in the real space calculated by the real space position calculation process unit.

5. A vehicle surroundings monitoring apparatus according to claim 4 further comprising a movement vector calculation process unit which calculates a movement vector of the monitored object in the real space from the position of the identical monitored object in the real space at different time points calculated by the real space position calculation process unit, wherein the contact determination process unit determines whether there is a possibility of contact between the monitored object and the vehicle based on the movement vector calculated by the movement vector calculation process unit.

6. A vehicle surroundings monitoring apparatus which detects a monitored object around a vehicle from images taken by a single camera mounted on the vehicle, said apparatus comprising:

a monitored object extraction process unit which extracts an image portion of the monitored object from the image taken by the camera;

a rate-of-change calculation process unit which calculates a rate of change in size of the image portion of an identical monitored object extracted by the monitored object extraction process unit from a plurality of images taken by the camera at predetermined time intervals; and a contact determination process unit which determines whether there is a possibility of contact between the monitored object and the vehicle based on the rate of change;

a position variation calculation process unit which calculates a position variation of the image portion of the identical monitored object extracted by the monitored object extraction process unit from the plurality of images taken by the camera at the predetermined time intervals, wherein the contact determination process unit determines that there is a high possibility of contact between the monitored object and the vehicle when the rate of change in size of the image portion calculated by the rate-of-change calculation process unit indicates a magnification of the image portion, regarding the image portion of the identical monitored object extracted by the monitored object extraction process unit from the plurality of images taken by the camera at the predetermined time intervals from a predetermined time point, and the position variation of the image portion calculated by the position variation calculation process unit is equal to or lower than a predetermined position variation threshold value.

7. A vehicle surroundings monitoring apparatus according to claim 6, further comprising an arrival time estimation process unit which estimates the vehicle arrival time which is the time to arrival of the monitored object at the vehicle based on the rate of change, wherein the contact determination process unit determines that there is a high possibility of contact between the monitored object and the vehicle when the rate of change in size of the image portion calculated by the rate-of-change calculation process unit indicates a magnification of the image portion, regarding the image portion of the identical monitored object extracted by the monitored object extraction process unit from the plurality of images taken by the camera at the predetermined time intervals from the predetermined time point, the position variation of the image portion calculated by the position variation calculation process unit is equal to or lower than the predetermined position variation threshold value, and the vehicle arrival time estimated by the arrival time estimation process unit is equal to or less than a predetermined time.

8. A vehicle surroundings monitoring apparatus according to claim 6, further comprising:

a ranging process unit which detects a distance between the vehicle and the monitored object; and a position variation threshold setting process unit which sets the position variation threshold value according to the distance between the vehicle and the monitored object.

9. A vehicle surroundings monitoring apparatus according to claim 8, wherein the position variation threshold setting process unit sets the position variation threshold value based on the distance between the vehicle and the monitored object at each imaging timing detected by the ranging process unit, the vehicle width or vehicle height of the vehicle, and a focal length of the camera when the monitored object is taken by the camera at the predetermined time intervals from the predetermined time point.

* * * * *